US010145971B2

United States Patent
Bertrand et al.

(10) Patent No.: US 10,145,971 B2
(45) Date of Patent: Dec. 4, 2018

(54) MULTI-STATION SEISMIC SENSOR STRINGS

(71) Applicant: INOVA, LTD., George Town, Grand Cayman (KY)

(72) Inventors: Wilfred Bertrand, Meadows Place, TX (US); Arjun Selvakumar, Bellaire, TX (US)

(73) Assignee: INOVA LTD, Grand Cayman (KY)

( * ) Notice: Subject to any disclaimer, the term of this patent is extended or adjusted under 35 U.S.C. 154(b) by 422 days.

(21) Appl. No.: 14/486,558

(22) Filed: Sep. 15, 2014

(65) Prior Publication Data
US 2015/0078127 A1    Mar. 19, 2015

Related U.S. Application Data

(60) Provisional application No. 61/878,512, filed on Sep. 16, 2013.

(51) Int. Cl.
*G01V 1/00*   (2006.01)
*G01V 1/22*   (2006.01)

(52) U.S. Cl.
CPC ..................... *G01V 1/22* (2013.01)

(58) Field of Classification Search
CPC ....................................................... G01V 1/22
See application file for complete search history.

(56) References Cited

U.S. PATENT DOCUMENTS

| | | | | |
|---|---|---|---|---|
| 4,117,449 A * | 9/1978 | McNeel | ................. | G01V 1/181 174/541 |
| 4,628,493 A * | 12/1986 | Nelson | ..................... | G01V 1/22 340/870.13 |
| 4,809,245 A * | 2/1989 | Woodall | .................... | G01V 1/16 367/178 |
| 5,623,455 A * | 4/1997 | Norris | ...................... | G01V 1/20 367/13 |
| 5,627,798 A * | 5/1997 | Siems | ...................... | G01V 1/22 340/870.11 |
| 7,542,850 B2 * | 6/2009 | Humphrey | ............... | G01V 7/16 324/330 |
| 7,773,457 B2 * | 8/2010 | Crice | .................... | G01V 1/223 367/76 |
| 8,000,171 B2 * | 8/2011 | Hache | ...................... | G01V 1/16 367/188 |
| 2003/0174582 A1* | 9/2003 | Scott | ...................... | G01V 1/201 367/178 |
| 2004/0156267 A1* | 8/2004 | O'Brien | ................. | G01V 1/003 367/149 |

\* cited by examiner

*Primary Examiner* — Krystine E Breier
(74) *Attorney, Agent, or Firm* — Mossman, Kumar & Tyler PC

(57) ABSTRACT

Methods, apparatuses, and systems are disclosed for multi-station sensor strings. One example apparatus includes a sensor string. The sensor string includes a connector and a common data transmission channel configured to be in communication with a data acquisition unit through the connector. The sensor string also includes a first seismic sensor configured to provide sensed seismic data to the common data transmission channel, and a second seismic sensor also configured to provide sensed seismic data to the common data transmission channel.

13 Claims, 9 Drawing Sheets

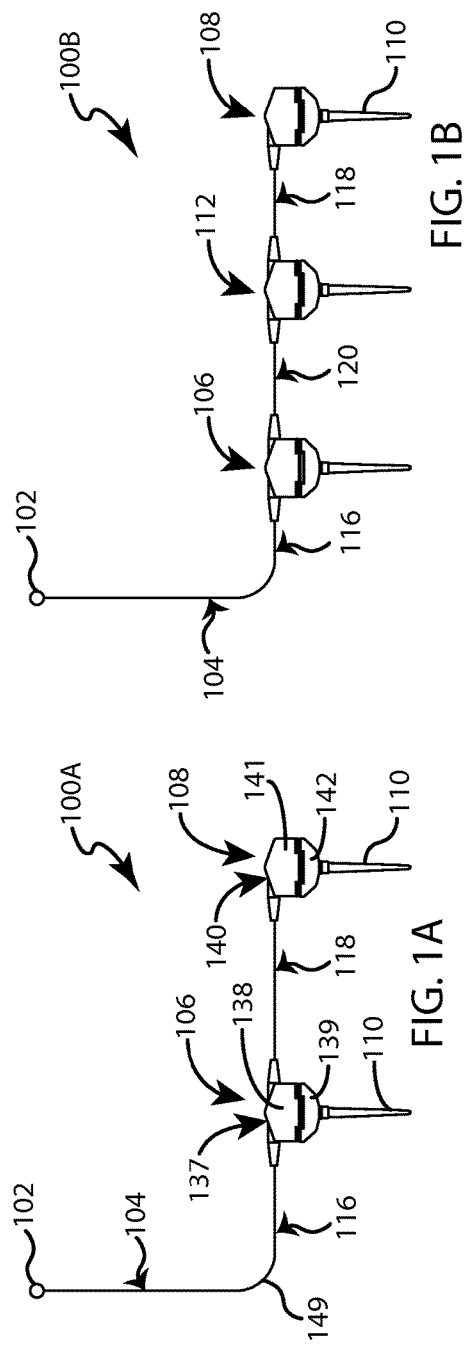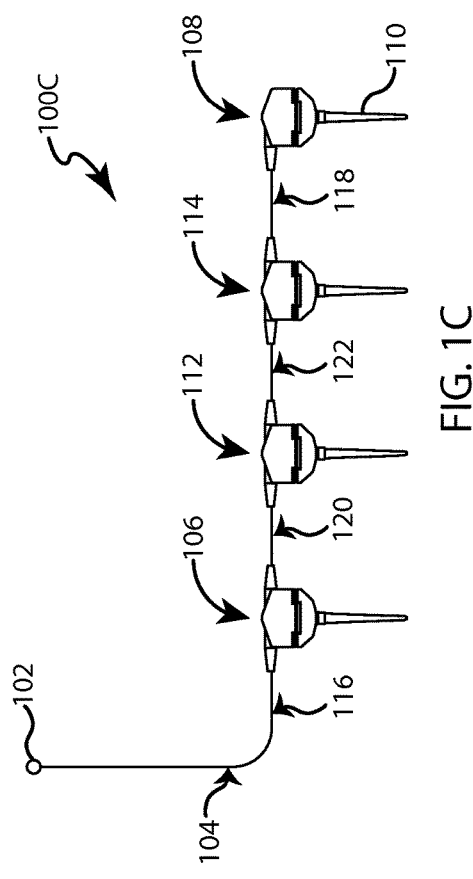

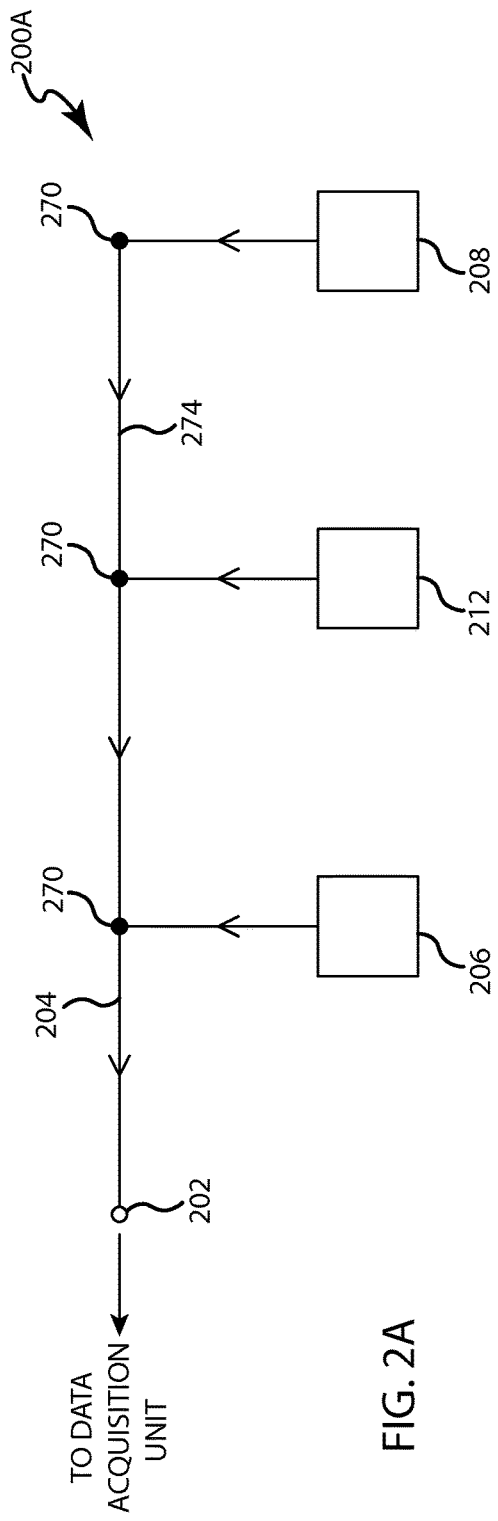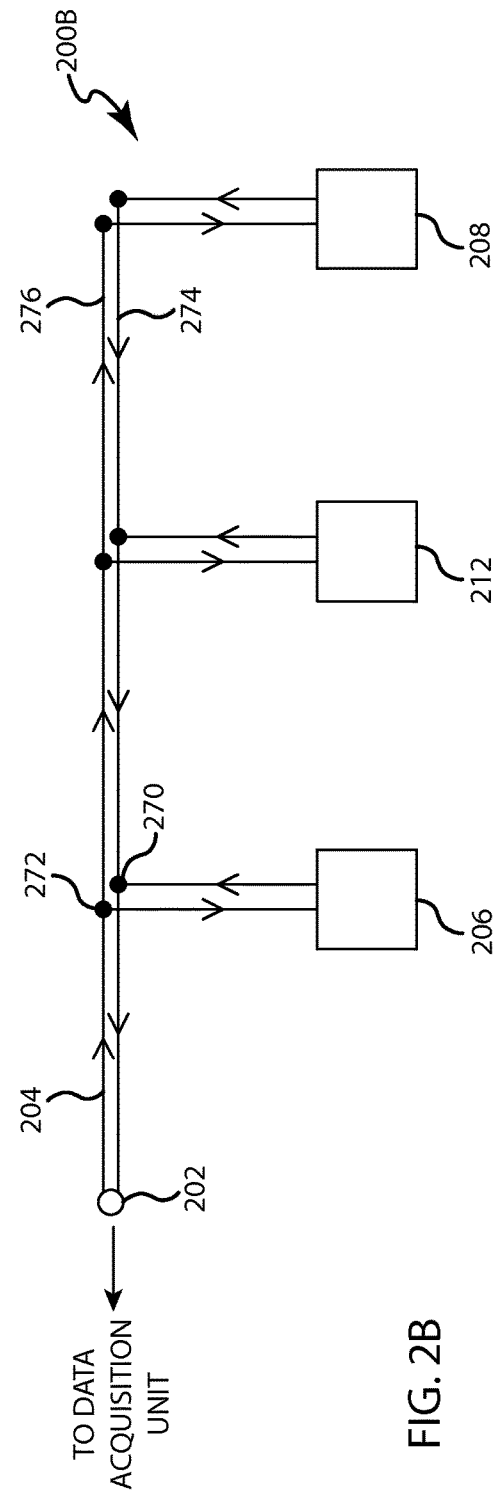

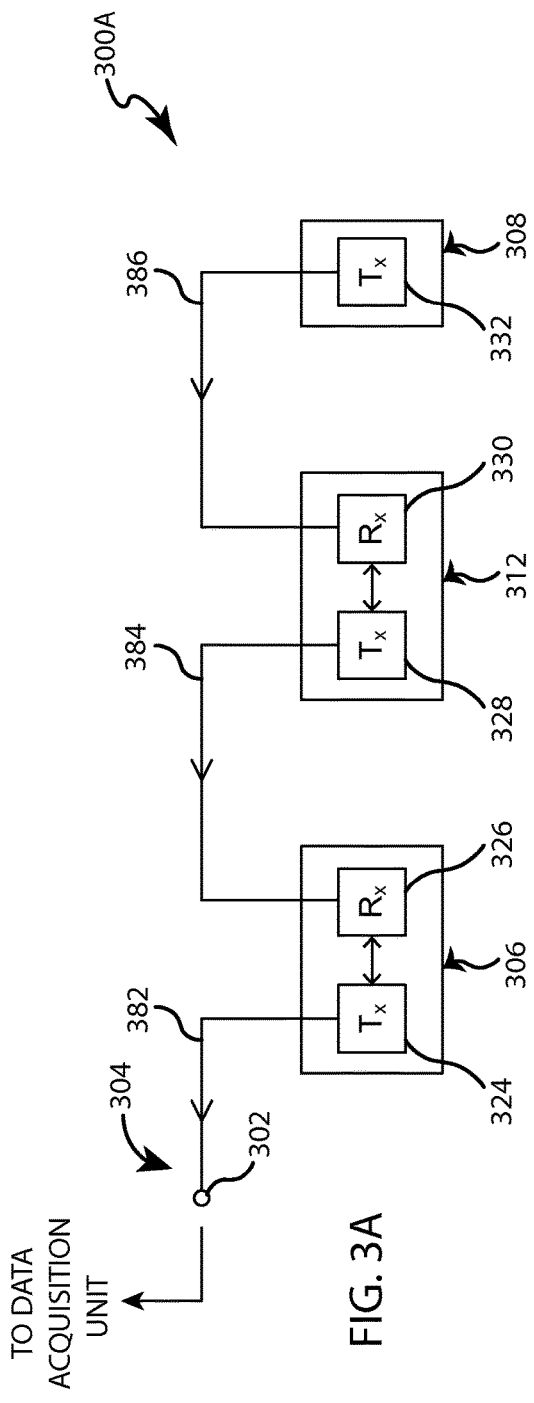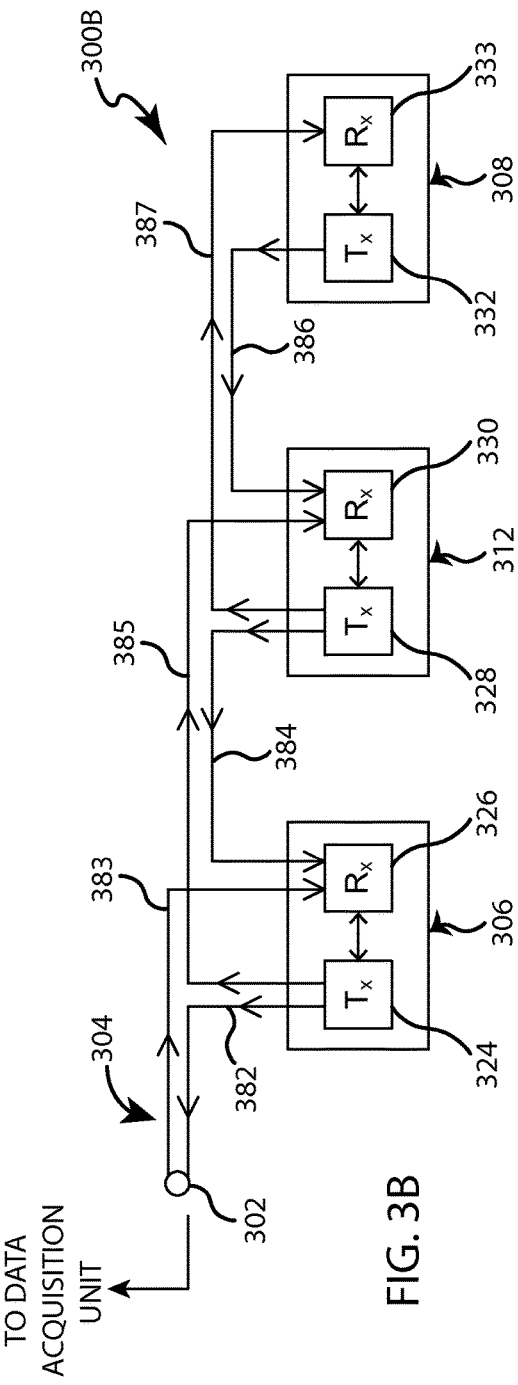

| POSITION | BINARY CODE | PIN CONNECTIONS |
|---|---|---|
| 1 | 10 | OPEN, GND |
| 2 | 01 | GND, OPEN |
| 3 | 00 | GND, GND |

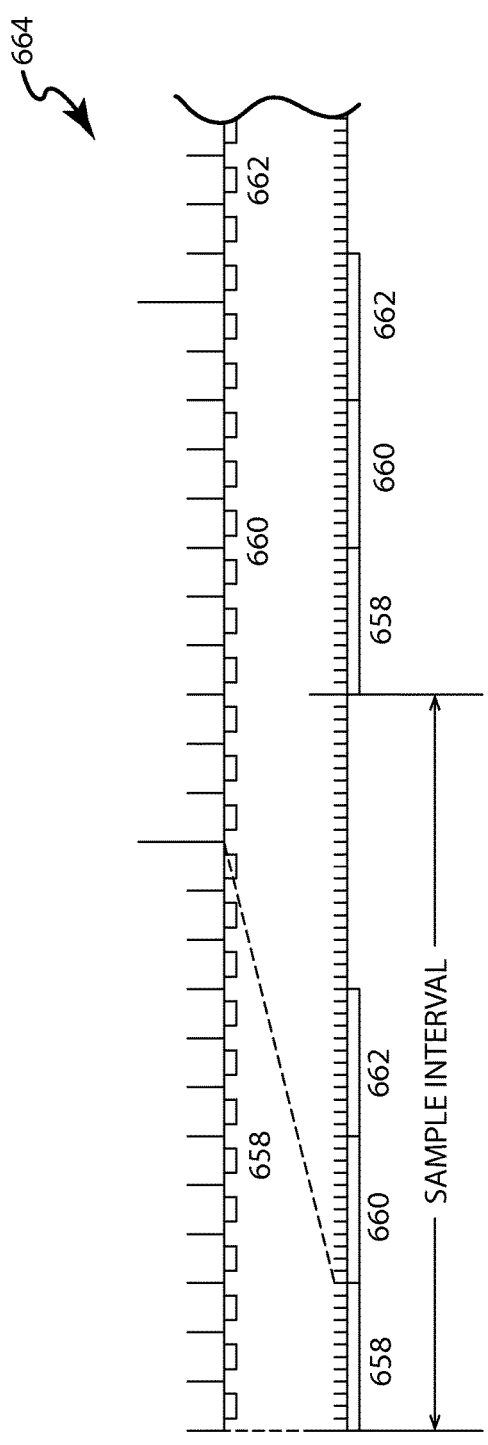
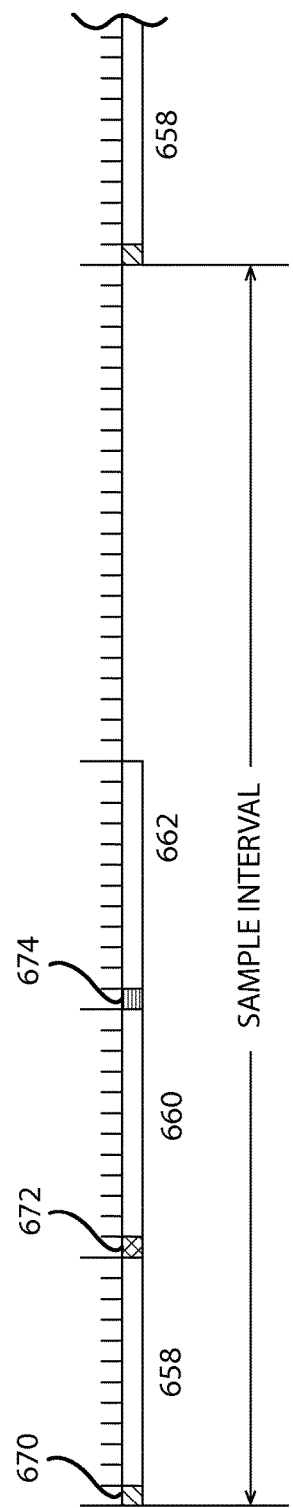
FIG. 6A
FIG. 6B

MULTI-STATION SEISMIC SENSOR STRINGS

This application is related to U.S. provisional application No. 61/878,512, filed on Sep. 16, 2013, and entitled "Multi-Station Sensor Strings," the entirety of which is hereby incorporated by reference for all purposes.

TECHNICAL FIELD

The present invention relates generally to seismic exploration, and more specifically to multi-station seismic sensor strings.

BACKGROUND

Seismic surveys are conducted by deploying a large array of seismic sensors over a target area. Typically, these arrays may cover many square miles and may include thousands or tens of thousands of seismic sensors. An energy source is activated thereby causing a seismic wave to propagate through the subsurface structures of the earth. A portion of the seismic wave is reflected at discontinuities, and these reflections are sensed at the surface by the seismic sensors and recorded for later processing. Such sensing and recording are referred to as seismic data acquisition. In some instances, seismic data may be acquired passively—that is, without an active source.

Many different seismic data acquisition architectures exist. In one example, a point-to-point cable connection is used to connect each seismic sensor to a data acquisition unit. The data acquisition unit relays the signals from the sensors to a central recording location via either a wired or wireless connection. The data acquisition units and various cables connecting the sensors, data acquisition units, and the central recording location may be collectively referred to as ground electronics, and constitute a substantial portion of the overall cost and energy draw of a seismic data acquisition system.

In some instances, multiple sensors may be connected to a single data acquisition unit in order to reduce the ground electronics cost per seismic sensor. For example, a plurality of seismic sensors may be coupled to a plurality of receiver line takeout connections on a receiver line, or a plurality of seismic sensors may be integrally formed within a "link" style receiver line. Single seismic sensors coupled to takeout connections typically have a large amount of ground electronics equipment per sensor. "Link" style systems, on the other hand, may have lower ground electronics equipment per sensor but can be prone to complicated field debugging issues and increased labor demands. "Link" style systems are also heavy and may require connectivity on both sides of the link to operate. "Link" style segments are also inherently noisy—external forces (for example wind) may induce vibration or other forms of mechanical energy into the receiver line which is directly coupled into the sensors.

In both single-seismic-sensor-per-takeout systems and "link" style systems, the ground electronics equipment can account for upwards of seventy-five percent of total system cost. In addition to initial capital expenditure costs, ground electronics equipment typically requires ongoing power and labor resource during the seismic survey, which also adds to the costs of seismic data acquisition.

SUMMARY

An apparatus, e.g., for seismic data collection, comprises a set of sensor elements or sensor string. Depending on the embodiment, the sensor string may have a connector, a common data transmission channel configured to be in communication with a data acquisition unit through the connector, and first and second seismic sensors. The first seismic sensor can be configured to provide sensed seismic data to the common data transmission channel. The second seismic sensor can also be configured to provide sensed seismic data to the common data transmission channel.

In various embodiments, the sensor string may define a first housing enclosing the first seismic sensor and a second housing enclosing the second seismic sensor, and each of the first and second housings may comprise an upper portion and a lower portion. The common data transmission channel may be positioned in the upper portions of the first and second housings, and the first seismic sensor can be positioned in the lower portion of the first housing, with the second seismic sensor positioned in the lower portion of the second housing, and the respective electrical couplings provided between the respective first and second seismic sensors and the common data transmission channel. The upper portions of the first and second housings can be formed together, with a cable defining the common data transmission channel.

The apparatus may include a third seismic sensor, also configured to provide sensed seismic data to the common data transmission channel. The first, second, and third seismic sensors can be serially positioned relative to one another, thereby forming a linear structure for the sensor string.

Depending on the embodiment, the first seismic sensor may provide sensed seismic data to the common data transmission channel during a first time slot and the second seismic sensor may provide sensed seismic data to the common data transmission channel during a second time slot, where the first and second time slots may not overlap. The first seismic sensor and the second seismic sensor may also provide seismic data to the common data transmission channel using multiplexing, for example one or more of time-division multiplexing, frequency-division multiplexing, or wavelength-division multiplexing.

In some embodiments, the connector of the sensor string can be configured to be coupled to one of a plurality of takeout connections of a receiver line connected to a cabled data acquisition unit. The connector of the sensor string can also be configured to be coupled to a wireless data acquisition unit.

The common data transmission channel can comprise a twisted pair, for example a twisted pair that is also configured to provide power to any one or more of the first, second and third seismic sensors. The common data transmission channel can also be a continuous transmission medium, and each or any one or more of the first, second and third seismic sensors may be electrically coupled to the continuous transmission medium. The common data transmission channel may also comprise a plurality of segments. For example, a first of the plurality of segments of the common data transmission channel may be positioned between the connector and the first seismic sensor, and a second of the plurality of segments of the common data transmission channel may be positioned between the first seismic sensor and the second seismic sensor.

Any one or more of the first, second and third seismic sensors may comprise a receiver and a transmitter, and can be configured to provide its own sensed seismic data to the data acquisition unit via the transmitter, and/or further configured to receive sensed seismic data from the second seismic sensor via the receiver and provide the sensed seismic data received from the second seismic sensor to the data acquisition unit via the transmitter. Any one of the first, second and this seismic sensors may comprise a first, second or third termination board, respectively, and any one or more of the first, second and third segments of the common data transmission channel may be coupled between the connector or connectors and the first, second, and third termination boards, respectively. In some examples, any one or more of the first, second and third termination boards may be encoded with a first, second and third binary code, respectively. In still other examples, the first binary code identifies or auto identifies the first seismic sensor and the second binary code identifies or auto identifies the second seismic sensor position on the common data transmission channel.

In seismic data acquisition system embodiments, the system may comprise a data acquisition unit configured to transmit data to a central recording unit, a receiver line coupled to the data acquisition unit and defining a takeout connection, and a sensor string (e.g., a set of a plurality of seismic sensors or sensor nodes). Depending upon the example, the sensor string may comprise a connector coupled to the takeout connection, a common data transmission channel communicatively coupled to the data acquisition unit through the connector, and a plurality of seismic sensors, each of the plurality of seismic sensors configured to provide sensed seismic data to the common data transmission channel.

In some embodiments, the plurality of seismic sensors may be or comprise digital sensors. The sensor string may further comprise at least one terminator configured to reduce reflections, and the plurality of seismic sensors can be configured to be disposed at different ground locations away from the receiver line. For example, the sensor string may generally define a T-shaped structure.

Each of the plurality of seismic sensors may comprise a housing that is unique in color. Alternatively, any one or more of the plurality of seismic sensors may comprise a housing that is unique in color.

In some embodiments, the sensor string generally defines an in-line shaped or linear structure. In embodiments where a T-shaped sensor string is used, each of the plurality of seismic sensors can be arranged or laid out in the field in either of at least two in-line directions from the data acquisition unit or in either of two linear segments of the T-shaped structure, wherein each of the linear segments is arranged in a different direction from the data acquisition unit. In some embodiments, the first seismic sensor is configured to provide sensed seismic data to the common data transmission channel preceded by a first position data header, and the second seismic sensor is configured to provide sensed seismic data to the common data transmission channel preceded by a second position data header. The first seismic sensor may also be configured to provide sensed seismic data to the common data transmission channel in a first time slot, and the second seismic sensor is configured to provide sensed seismic data to the common data transmission channel in a second time slot. The first seismic sensor may also be configured with a first positional encoding, and the second seismic sensor is configured with a second positional encoding.

Additional seismic data acquisition systems may comprise a wireless data acquisition unit and a sensor string. The sensor string may comprise, for example, a connector coupled to the wireless data acquisition unit, a common data transmission channel communicatively coupled to the wireless data acquisition unit through the connector, a first seismic sensor can be configured to provide sensed seismic data to the common data transmission channel, and a second seismic sensor can also be configured to provide sensed seismic data to the common data transmission channel.

In such embodiments, the first seismic sensor can be configured to provide sensed seismic data to the common data transmission channel preceded by a first position data header, and the second seismic sensor can be configured to provide sensed seismic data to the common data transmission channel preceded by a second position data header. A third seismic sensor can also be provided, and configured to provide sensed seismic data to the common data transmission channel preceded by a third position data header Depending on the application, the first seismic sensor can be configured to provide sensed seismic data to the common data transmission channel in a first time slot, and the second seismic sensor is configured to provide sensed seismic data to the common data transmission channel in a second time slot. Alternatively, each of the first, second, third and/or ensuing seismic sensors can be configured to provide sensed seismic data to the common data transmission channel in corresponding first, second, third and/or ensuing time slots.

The first seismic sensor can be configured with a first positional encoding, and the second seismic sensor can be configured with a second positional encoding. Alternatively, each of the first, second, third and/or ensuing seismic sensors can be configured with positional encoding.

In method embodiments, the method may comprise acquiring a first seismic data sample using a first seismic sensor of a sensor string, acquiring a second seismic data sample using a second seismic sensor of the sensor string at substantially the same time as acquiring the first seismic data sample using the first seismic sensor, and transmitting the first and second seismic data samples to a data acquisition unit via a common data transmission channel of the sensor string. The first seismic data sample can be transmitted via the common data transmission channel using a first portion of available data communication resources of the common data transmission channel, and the second seismic data sample can be transmitted via the common data transmission channel using a second non-overlapping portion of available data communication resources of the common data transmission channel.

The first seismic data sample can also transmitted via the common data transmission channel during a first transmission period, and the second seismic data sample can be transmitted via the common data transmission channel during a second transmission period that does not overlap with the first transmission period. Alternatively, each of the seismic data samples from first, second, third and/or ensuing seismic sensors of the sensor string may be transmitted via the common data transmission channel during respective transmission periods that do not overlap.

Alternatively or in combination, the first seismic data sample can transmitted via the common data transmission channel at a first frequency, and the second seismic data sample can be transmitted via the common data transmission channel at a second frequency. For example, each of first, second, third and/or ensuing seismic data samples from corresponding seismic sensors of the sensor string may be transmitted respective frequencies. The respective frequencies may be different for one or more of the seismic sensors, or for each of the seismic sensors; for example, the frequencies may be unique to each of the seismic data samples, and/or to each of the seismic sensors in the sensor string.

Depending on the application, a sample rate of acquiring seismic data using the first and second seismic sensors may be less than a transmission rate of transmitting the first and second seismic data samples via the common data transmission channel. In addition, relative locations of the first, second, third and/or ensuing seismic sensors may be determined based on physical dimensions of the sensor string and a connection point of the sensor string. Additionally, the first and second seismic data samples may be transmitted via the common data transmission channel by at least transmitting the first seismic data sample from a first transmission channel segment associated with the first seismic sensor to a second transmission channel segment associated with the second seismic sensor, and transmitting the first and second data samples together from the second transmission channel segment towards the data acquisition unit.

BRIEF DESCRIPTION OF THE DRAWINGS

FIG. 1A is a side view of one example of a sensor string.

FIG. 1B is a side view of another example of a sensor string.

FIG. 1C is a side view of another example of a sensor string.

FIG. 2A is a simplified block diagram of the sensor string shown in FIG. 1B illustrating one example of electrical connections of the sensor string.

FIG. 2B is a simplified block diagram of the sensor string shown in FIG. 1B illustrating another example of electrical connections of the sensor string.

FIG. 3A is a simplified block diagram of the sensor string shown in FIG. 1B illustrating another example of electrical connections of the sensor string.

FIG. 3B is a simplified block diagram of the sensor string shown in FIG. 1B illustrating another example of electrical connections of the sensor string.

FIG. 5 is a table illustrating positional binary encoding that may be used for the sensor string shown in FIG. 1B.

FIGS. 6A and 6B illustrate the transmission of seismic data from a plurality of seismic sensors on a common data transmission channel of the sensor string shown in FIG. 1B.

DETAILED DESCRIPTION

Figure 4:
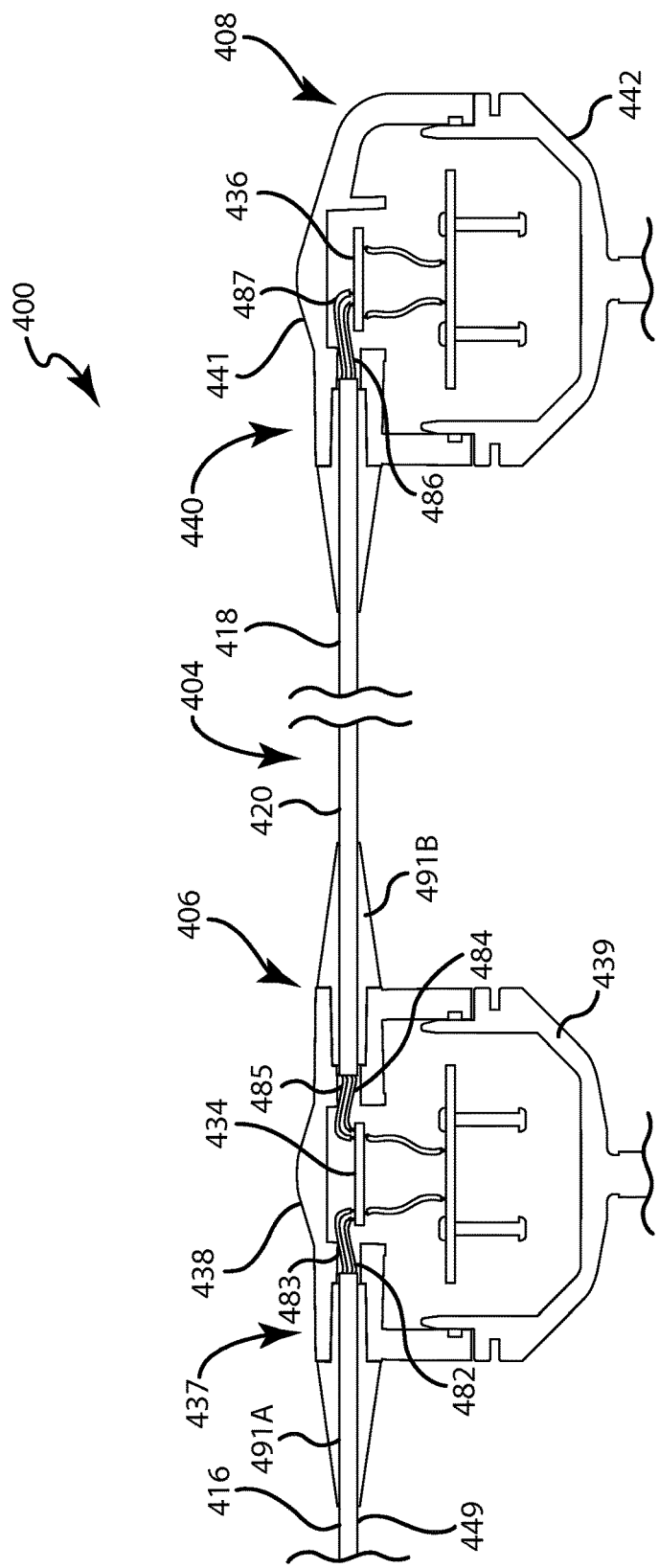
FIG. 4 is a simplified cross-sectional view of a portion of the sensor string shown in FIG. 1B.

FIG. 1A illustrates one example of a sensor string 100A. The sensor string 100A includes a connector 102 and a common data transmission channel 104 that is configured to be in communication with a data acquisition unit through the connector 102. The sensor string 100A also includes a first seismic sensor 106 configured to provide sensed seismic data to the common data transmission channel 104, and a second seismic sensor 108 also configured to provide sensed seismic data to the common data transmission channel 104. Although two seismic sensors 106, 108 are shown in the sensor string 100A of FIG. 1A, it will be appreciated that a sensor string may include any number of a seismic sensors, a few examples of which are shown in FIGS. 1B and 1C and described below.

Returning to FIG. 1A, the seismic sensors 106, 108 may be any type of sensor capable of sensing seismic data, including for example a digital microelectromechanical (or MEMS) acceleration or digital velocity sensor. The first seismic sensor 106 may be enclosed within a first housing 137 defined by the string 100A, and the second seismic sensor 108 may be enclosed within a second housing 140 also defined by the string 100A. The first housing 137 may include an upper portion 138 and a lower portion 139, with the common data transmission channel 104 positioned in the upper portion 138 of the first housing 137 and the first seismic sensor 106 positioned in the lower portion 139 of the first housing 137. Similarly, the second housing 140 may include an upper portion 141 and a lower portion 142, with the common data transmission channel 104 positioned in the upper portion 141 of the second housing 140 and the second seismic sensor 108 positioned in the lower portion 142 of the second housing 140. As will be shown and described below, respective electrical couplings may be provided between the first and second seismic sensors 106, 108 and the common data transmission channel 104. Also, in some examples, the upper portions 138, 141 of the first and second housings 137, 140 may be formed together with a cable 149 defining the common data transmission channel 104.

In some embodiments, and as illustrated in FIG. 1A, spikes 110 may be coupled to respective lower portions 139, 142 of the first and second housings 137, 140 for the first and second seismic sensors 106, 108 in order to improve coupling of the housings 137, 140 with the ground. The spikes 110 may be removable and replaceable to facilitate replacement of spikes 110 and/or storage/transportation of the sensor string 100A.

As mentioned above, the sensor string 100A illustrated in FIG. 1A includes a common data transmission channel 104 to which the first and second seismic sensors 106, 108 are electrically coupled. The common data transmission channel 104 may be a continuous transmission medium such as a twisted pair, a fiber optic cable, etc., or generally any single, continuous medium over which data and/or power can be transmitted to and/or from multiple ones (i.e., both) of the seismic sensors 106, 108. In embodiments where the common data transmission channel 104 is a single, continuous transmission medium, the first and second seismic sensors 106, 108 may be electrically coupled directly to the continuous medium—e.g., one or more wired connections may be established between the first and second seismic sensors and the common data transmission channel 104, as explained for example below with reference to FIGS. 2A and 2B. Also, although the common data transmission channel 104 may be a single, continuous transmission medium, with the first and second seismic sensors 106, 108 coupled thereto, the sensor string 100A may nonetheless define a plurality of portions. For example, as illustrated in FIG. 1A, the sensor string 100A may define first and second portions 116, 118. The first portion 116 of the sensor string 100A may include a length of the common data transmission channel 104 between the connector 102 and the connection of the first seismic sensor 106, while the second portion 118 of the sensor string 100A may include a length of the common data transmission channel 104 between the connection of the first seismic sensor 106 and the connection of the second seismic sensor 108.

In some embodiments, the common data transmission channel 104 may be formed from a plurality of separate and individual segments. The separate and individual segments may in some examples correspond with the one or more portions 116, 118 of the sensor string 100A described above. For example, referring to FIG. 1A, a segmented common data transmission channel 104 may include a first segment positioned between the connector 102 and the first seismic sensor 106, and corresponding with the first portion 116 of the sensor string 100A. The segmented data transmission channel 104 may also include a second, separate segment positioned between the first seismic sensor 106 and the second seismic sensor 108, the second, separate segment corresponding with the second portion 118 of the sensor string 100A. The first and second segments in these embodiments may form distinct transmission mediums which, when coupled together, form the common data transmission channel 104. As with the single, continuous transmission medium described above, a common data transmission channel 104 including a plurality of segments forms a medium over which data and/or power can be transmitted to and/or from both of the first and second seismic sensors 106, 108. In embodiments where the common data transmission channel 104 comprises a plurality of segments, each of the first and second seismic sensors 106, 108 may provide a link between the segments (e.g., a termination board that connects the segments) of the common data transmission channel 104, as described below.

The first and second seismic sensors 106, 108 may provide seismic data to the common data transmission channel 104 using multiplexing in some embodiments. The multiplexing may be any type of multiplexing protocol, including, but not limited to, time-division multiplexing, frequency-division multiplexing, and/or wavelength-division multiplexing. In one example, the first seismic sensor 106 may provide a first seismic data sample to the common data transmission channel 104 during a first time slot, and the second seismic sensor 108 may provide a second seismic data sample to the common data transmission channel 104 during a second time slot. The first time slot and the second time slot may be independent and non-overlapping. In another example, a first seismic data sample may be transmitted via the common data transmission channel 104 at a first frequency, and a second seismic data sample may be transmitted via the common data transmission channel 104 at a second frequency. More generally, the first seismic data sample may be provided to and transmitted via the common data transmission channel 104 using a first portion of available data communication resources of the common data transmission channel 104, and the second seismic data sample may be provided to and transmitted via the common data transmission channel 104 using a second, non-overlapping portion of available data communication resources of the common data transmission channel 104. Available data communication resources of the common data transmission channel 104 include, but are not limited to, time, frequency, and wavelength available on the common data transmission channel 104.

Referring still to FIG. 1A, the seismic sensors 106, 108 of the sensor string 100A may be configured to be disposed at different ground locations when the sensor string 100A is deployed. In some embodiments, the seismic sensors 106, 108 may be disposed away from, for example, a receiver line, a data acquisition unit, etc. For example, the connector 102 of the sensor string 100A may be attached to a takeout connection of a receiver line, or directly to a data acquisition unit, and the slack provided by the first portion 116 of the sensor string 100A may be used to position the first seismic sensor 106 at some distance away from the receiver line or data acquisition unit. Similarly, the slack provided by the second portion 118 of the sensor string 100A may be used to position the second seismic sensor 108 at some distance away from both the first seismic sensor 106 and the receiver line or data acquisition unit. In some embodiments, the first seismic sensor 106 and the second seismic sensor 108 may be positioned serially relative to each other (as shown in FIG. 1A, for example), thereby forming a linear structure that runs parallel to, for example, a receiver line (see, e.g., FIG. 7). In this manner, the seismic sensors 106, 108 may run along the receiver line, but may be mechanically decoupled from the receiver line in order to reduce transmission of mechanical noise on the receiver line to the seismic sensors 106, 108.

Once positioned, the relative locations of the seismic sensors 106, 108 may be determined based on the physical dimensions of the sensor string 100A (i.e., the lengths of the first and second portions 116, 118) and the connection point of the sensor string 100A itself. In other words, if it is known that a certain sensor string 100A is connected to, for example, a receiver line at a certain absolute position, and it is known that the first and second seismic sensors 106, 108 are positioned in a certain manner relative to the connector 102, then the absolute locations of the first and second seismic sensors 106, 108 can be determined. Of course, the locations of the seismic sensors 106, 108 may also be determined using other techniques, such as GPS.

With reference now to FIG. 1B, another example of a sensor string 100B is shown. The sensor string 100B is generally similar to the sensor string 100A shown in FIG. 1A, except that the sensor string 100B in FIG. 1B includes a third seismic sensor 112 that is also configured to provide sensed seismic data to the common data transmission channel 104. Also, the sensor string 100B in FIG. 1B may define a third portion 120 between the first seismic sensor 106 and the third seismic sensor 112, while the second portion 118 is defined between the third seismic sensor 112 and the second seismic sensor 108.

With reference to FIG. 1C, yet another example of a sensor string 100C is shown. The sensor string 100C is generally similar to the sensor string 100A shown in FIG. 1A and the sensor string 100B shown in FIG. 1B, except that the sensor string 100C in FIG. 1C includes a fourth seismic sensor 114 that is also configured to provide sensed seismic data to the common data transmission channel 104. Also, the sensor string 100B in FIG. 1B may define a fourth portion 122 between the third seismic sensor 112 and the fourth seismic sensor 114. It will be appreciated from FIGS. 1A through 1C that, in general, a sensor string may include any number of seismic sensors, such as 2, 3, 4, 5, 6, 7, 8, or even more.

With reference now to FIGS. 2A and 2B, two examples of the electrical connections of sensor strings 200A, 200B with a continuous common data transmission channel 204 will be described. For illustration purposes, the sensor strings 200A, 200B shown in FIGS. 2A and 2B and described herein include three seismic sensors 206, 212, 208, similar to the sensor string 100B illustrated in FIG. 1B and described above. As shown in FIG. 2A, in some embodiments, the common data transmission channel 204 of a sensor string 200A may have a single one-way link or segment 274 that only allows data to be sent from the sensors 206, 212, 208 to a data acquisition unit through the connector 202. In these embodiments, each of the first, second, and third seismic sensors 206, 212, 208 are electrically coupled to the one-way segment 274 via a connection 270. The connections 270 between the first, second, and third sensors 206, 212, 208 and the one-way segment 274 may allow sensed seismic data from the first seismic sensor 206, sensed seismic data from the second seismic sensor 208, and sensed seismic data from the third seismic sensor 212 to be transmitted via the one-way segment 274 to the data acquisition unit 246 through the connector 202. Referring still to FIG. 2A, in some examples, power may be provided to the seismic sensors 206, 212, 208 via the connector 202, whereas in other examples the seismic sensors 206, 212, 208 may be independently powered.

With reference now to FIG. 2B, in some embodiments the common data transmission channel 204 of a sensor string 200B with three seismic sensors 206, 212, 208 may have two one-way links or segments 274, 276, thus forming a two-way data transmission channel 204. In these embodiments, each of the first, second, and third seismic sensors 206, 212, 208 are electrically coupled to the first one-way segment 274 via respective first connections 270 and are electrically coupled to the second one-way segment 276 via respective second connections 272. The respective first connections 270 between the first, second, and third sensors 206, 212, 208 and the first one-way segment 274 may allow sensed seismic data from the first seismic sensor 206, sensed seismic data from the second seismic sensor 208, and sensed seismic data from the third seismic sensor 212 to be transmitted via the one-way segment 274 to the data acquisition unit 246 through the connector 202. The respective second connections 272 between the first, second, and third sensors 206, 212, 208 and the second one-way segment 276 may allow power and/or control/commands to be sent to the first, second, and third seismic sensors 206, 208, 212 from the data acquisition unit 246 through the connector 202.

With reference now to FIGS. 3A and 3B, two examples of the electrical connections of sensor strings 300A, 300B with a segmented common data transmission channel 304 will be described. For illustration purposes, the sensor strings 300A, 300B shown in FIGS. 3A and 3B and described herein include three seismic sensors 306, 312, 308, similar to the sensor string 100B illustrated in FIG. 1B and described above.

Referring first to the embodiment of a sensor string 300A illustrated in FIG. 3A, each of the three seismic sensors 306, 312, 308 may have a respective transmitter 324, 328, 332, and at least the first and third seismic sensors 306, 312 may also have a respective receiver 326, 330. As illustrated in FIG. 3A, in some embodiments, the segmented common data transmission channel 304 of a sensor string 300A may include a plurality of one-way segments 382, 384, 386. The first one-way segment 382 may be coupled between the transmitter 324 of the first seismic sensor 306 and the connector, the second one-way segment 384 may be coupled between the transmitter 328 of the third seismic sensor 312 and the receiver 326 of the first seismic sensor 306, and the third one-way segment 386 may be coupled between the transmitter 332 of the second seismic sensor 308 and the receiver 330 of the third seismic sensor 312. Each of the respective one-way segments 382, 384, 386 allows data to be sent from the sensors 306, 312, 308 towards the data acquisition unit. For example, sensed seismic data from the second seismic sensor 308 is sent over the third one-way segment 386 from the transmitter 332 of the second seismic sensor 308 to the receiver 330 of the third seismic sensor 312. That data received from the second seismic sensor 308, together with sensed seismic data from the third seismic sensor 312, is sent over the second one-way segment 384 from the transmitter 328 of the third seismic sensor 312 to the receiver 326 of the first seismic sensor 306. The data received from both the second and third seismic sensors 308, 312, together with sensed seismic data from the first seismic sensor 306, is sent over the first one-way segment 382 from the transmitter 324 of the first seismic sensor 306 to the connector 302 and on to the data acquisition unit. In this daisy-chain type of connection, data from the plurality of the seismic sensors 306, 312, 308 is thus provided to, for example, a data acquisition unit via the common data transmission channel 304.

With reference now to FIG. 3B, the electrical connections for another example of a sensor string 300B will now be described. The sensor string 300B illustrated in FIG. 3B is generally similar to the sensor string 300A illustrated in FIG. 3A, except that the sensor string 300B in FIG. 3B includes additional one-way segments 383, 385, 387, and the second seismic sensor 308 includes a receiver 333. The additional one-way segments 383, 385, 387 may be used to send control/commands and/or power to the seismic sensors 306, 312, 308. For example, if the data acquisition unit needs to send timing information to the second seismic sensor 308, the timing information may be sent first to the receiver 326 of the first seismic sensor 306 via the fourth one-way segment 383. The timing information may then pass from the transmitter 324 of the first seismic sensor 306 to the receiver 330 of the third seismic sensor 312 via the fifth one-way segment 385, and then pass from the transmitter 328 of the third seismic sensor 312 to the receiver 333 of the second seismic sensor 308. In this manner, the common data transmission channel 304 may be a two-way daisy chain connection. Of course, other control/commands may similarly be provided to each of the seismic sensors 306, 312, 308, and power may also be provided to the seismic sensors 306, 312, 308 via the common data transmission channel 304 in some embodiments.

With reference to FIGS. 2A through 3B, it will be appreciated that one or more terminators may be included in the common data transmission channel 204, 304 of a sensor string to reduce or eliminate reflections. Also, while FIGS. 2A and 2B have illustrated two embodiments of a continuous common data transmission channel 204, it will be appreciated that other types of continuous data transmission channels may be used, such as a single two-way link or segment that allows for power and control/commands to be provided to the sensors and for data from the sensors to be provided to a data acquisition unit through the connector. Similarly, while FIGS. 3A and 3B have illustrated two embodiments of a segmented common data transmission channel 304, it will be appreciated that other types of segmented common data transmission channels may be used. In general, any type of continuous or segmented data transmission channel may be used, including those illustrated in any of FIG. 2A, 2B, 3A, or 3B in constructing a seismic sensor string according to the present disclosure.

Turning now to FIG. 4, a simplified cross-sectional view of a portion of a sensor string 400 is shown. The sensor string 400 shown in FIG. 4 may be the sensor string 100A shown in FIG. 1A or the sensor string 100B shown in FIG. 1B, for example, with similar reference numbers referring to similar parts. The common data transmission channel 404 of the sensor string 400 in FIG. 4 is illustrated with a two-way segmented common data transmission channel 404, like that described above with reference to FIG. 3B. However, as described above with reference to FIGS. 2A, 2B, and 3A, other forms of a common data transmission channel may be used, and that shown in FIG. 4 is merely one example of how the common data transmission channel may be constructed.

As illustrated in FIG. 4, a first termination board 434 is enclosed within the first housing 437 of the first seismic sensor 406. A plurality of segments 482, 483, 484, 485 of the common data transmission channel 404 are connected to the first termination board 434, which may include a transmitter and a receiver, like those shown in FIG. 3B. The first portion 416 of the cable 449 defining the common data transmission channel 404 includes a one-way segment 482 coupled between the connector of the sensor string 400 and the termination board 434 of the first sensor 406, with the one-way segment 482 providing a medium for sending data from the first sensor 406 to the connector of the sensor string 400 and on to a data acquisition unit, for example. The first portion 416 of the cable 449 also includes another one-way segment 483 also coupled between the connector of the sensor string 400 and the termination board 434 of the first sensor 406, which provides a medium for sending power and/or control/commands to the first sensor 406. As illustrated in FIG. 4, once the cable 449 enters the upper portion 438 of the first housing 437 of the first sensor 406, the one-way links 482, 483 are exposed and electrically coupled (e.g., soldered) to the first termination board 434.

Still referring to FIG. 4, the third portion 420 of the cable 449 defining the common data transmission channel 404 includes a one-way segment 484 coupled between a termination board of the third sensor (not shown) and the termination board 434 of the first sensor 406, with the one-way segment 484 providing a medium for sending data from the third sensor 412 to the first sensor 406 towards the connector of the sensor string 400 and on to the data acquisition unit, for example. The third portion 420 of the cable 449 also includes another one-way segment 485 also coupled between the termination board of the third sensor and the termination board 434 of the first sensor 406, which provides a medium for sending power and/or control/commands to the third sensor. As illustrated in FIG. 4, the one-way links 484, 485 are exposed within the upper portion 437 of the first housing 438 and electrically coupled (e.g., soldered) to the first termination board 434.

Still referring to FIG. 4, the second portion 418 of the cable 449 defining the common data transmission channel 404 includes a one-way segment 486 coupled between a termination board 436 of the second sensor 408 and the termination board of the third sensor (not shown), with the one-way segment 486 providing a medium for sending data from the second sensor 408 to the third sensor 412 towards the connector of the sensor string 400 and on to the data acquisition unit, for example. The second portion 418 of the cable 449 also includes another one-way segment 487 also coupled between the termination board of the third sensor and the termination board 436 of the second sensor 408, which provides a medium for sending power and/or control/commands to the second sensor 408. As illustrated in FIG. 4, the one-way links 486, 487 are exposed within the upper portion 431 of the first housing 440 and electrically coupled (e.g., soldered) to the second termination board 436.

In some embodiments, and as illustrated in FIG. 4, overmolds 491A, 491B may be formed over the cable 449 of the common data transmission channel 404 at the entry points to the upper portion 438 of the first housing 437 to secure the cable 449 to the first housing 437, and similar overmolds may be formed at the cable 449 entry points for the housings of the other sensors. The overmolds may form at least a partially protective seal to help prevent moisture and particles from entering the first housing 437 at the entry points of the cable 449. In some embodiments, a potting material (not visible in FIG. 4) may be used to further secure the one-way segments 482, 483, 484, 485 within the interior of the upper portion 438 of the first housing 437 (and also for the segments within the interior of the housings of the other sensors), further forming a moisture and particle barrier. In some examples, the termination board 434 may also be secured within the potting material (in which case electrical leads may extend downward from the termination board 434 and protrude out of the potting material towards other circuitry of the first sensor 406), whereas in other examples the one-way segments 482, 483, 484, 485 may extend below the potting material so that the termination board 434 can be positioned below the potting material.

With reference now to FIGS. 4 and 5, the seismic sensors of a sensor string may in some embodiments be configured with positional encoding. For example, the first termination board 434 of the sensor string 400 in FIG. 4 may be encoded with a first binary position code and the second termination board 436 may be encoded with a second binary position code. As described below with reference to FIG. 6, the positional encoding for each sensor of the sensor string may be used to identify the respective seismic sensor from which a certain seismic data sample originated. The positional encoding may be helpful because, as described above, sensed seismic data from a plurality of different seismic sensors is provided to the common data transmission channel. If a position code is added to each seismic data sample (e.g., as a header), with the position code corresponding to the seismic sensor that sensed that seismic data sample, then a data acquisition unit or central recording unit can determine the location corresponding to that seismic data sample for use in processing that seismic data sample based on the relative positioning of the seismic sensors.

Table 568 in FIG. 5 shows one example of positional encoding that may be used. As shown in table 568, position 1 may be associated with binary code 10 and may have pin connections of open, ground. Position 2 may be associated with binary code 01 and may have pin connections of ground, open. Position 3 may be associated with binary code 00 and may have pin connections of ground, ground. The positional encoding may be any combination of pin connections and binary coding, including combinations not described above. Using the positional encoding of table 568, the termination board of a first seismic sensor may be configured with the position 1 encoding, the termination board of a second seismic sensor may be configured with the position 2 encoding, and so on. In some instances, the termination board for each respective seismic sensor in the sensor string may be encoded with a distinct, non-overlapping positional encoding.

FIGS. 6A and 6B illustrate one example of the transmission of seismic data from a plurality of seismic sensors on a common data transmission channel of a sensor string, such as the sensors strings 100A, 100B, 100C, 200A, 200B, 300A, 300B, 400 described above. As mentioned above, a plurality of seismic sensors may provide seismic data to the common data transmission channel of a sensor string using multiplexing protocols, such as time-division, frequency-division, or wavelength-division multiplexing. One example of time-division multiplexing is shown in FIG. 6A, with a first seismic data sample 658 being transmitted via the common data transmission channel during a first transmission slot (e.g., a time slot for time division multiplexing), a second seismic data sample 660 being transmitted via the common data transmission channel during a second transmission slot, and a third seismic data sample 662 being transmitted via the common data transmission channel during a third transmission slot. The first seismic data sample 658 transmitted during the first transmission time slot may be from a first seismic sensor of a sensor string, the second seismic data sample 660 transmitted during the second transmission time slot may be from a second seismic sensor of the sensor string, and the third seismic data sample 662 transmitted during the third transmission time slot may be from a third seismic sensor of the sensor string.

The seismic sensors may be configured to provide sensed seismic data to the common data transmission channel during these respective time periods. For example, the first seismic sensor may be configured to only transmit sensed seismic data on the common data transmission channel during the first transmission slot, the second seismic sensor may be configured to only transmit sensed seismic data on the common data transmission channel during the second transmission slot, and the third seismic sensor may be configured to only transmit sensed seismic data on the common data transmission channel during the third transmission slot. The transmission slots during which respective seismic sensors transmit sensed seismic data may be predefined or may be configurable. For example, in some examples, the positional encoding of the termination boards (see FIG. 5) may define a transmission slot during which a particular seismic sensor will transmit sensed seismic data. In another embodiment, control signals may be provided to the seismic sensors providing commands to transmit sensed seismic data during certain transmission slots. Also, in some examples, timing signals may be provided to the seismic sensors via the common data transmission line, and/or independent timing signals can be generated at or provided to the seismic sensors in another manner.

An enlarged portion of FIG. 6A is shown in FIG. 6B illustrating position data headers 670, 672, 674 that may be used during the transmission of seismic data samples on the common data transmission channel. For example, the first seismic data sample 658 may be sent (from the first seismic sensor) together with a first position data header 670—for example, the position data header 670 may precede the actual seismic data sample 658. Similarly, the second seismic data sample 660 may be sent (from the second seismic sensor) together with a second position data header 672 and the third seismic data sample 662 may be sent (from the third seismic sensor) together with a third position data header 674. The position data headers 670, 672, 674 may be generated by the termination boards for each seismic sensor in some embodiments, and may be based on the positional encoding of the respective termination board.

In some examples, the position data header 670 may be combined with the actual seismic data sample 658 to be sent, whereas in other examples the position data header 670 may be sent separately from the seismic data sample 658. Also, while FIG. 6A shows the position data headers 670, 672, 674 preceding the respective seismic data samples 658, 660, 662 on the common data transmission channel, in other embodiments, the position data headers 670, 672, 674 may be sent after each respective seismic data sample, or the position data headers 670, 672, 674 may be sent together before any seismic data samples are sent, thus allowing a burst of seismic data to be provided to the common data transmission channel. Also, in some embodiments, no position data headers 670, 672, 674 may be used—instead, the seismic data samples may be identified by a data acquisition unit merely based on the timing and/or position of an incoming stream of data on the common data transmission channel. Alternatively, in some examples, the seismic data samples 658, 660, 662 may be provided to the common data transmission channel at random, non-assigned times as packets. In these embodiments, the headers 670, 672, 674 may identify to which seismic sensor the respective seismic data samples correspond.

Also, while FIGS. 6A and 6B primarily illustrate the transmission of seismic data samples on the common data transmission channel using time multiplexing, in other embodiments, the seismic data samples may be transmitted using other available resources of the common data transmission channel. For example, multiple frequencies of the common data transmission channel can be used to simultaneously (in time) send multiple seismic data samples using a common data transmission channel. In general, any available communication resources of the common data transmission channel can be shared among the plurality of sensors to transmit sensed seismic data.

Referring still to FIGS. 6A and 6B, in some embodiments, the sample rate of acquiring seismic data using the plurality of seismic sensors may be less than a transmission rate of transmitting the seismic data to, for example, a data acquisition unit via the common data transmission channel. For example, as illustrated in FIG. 6A, the sample interval (i.e., the time in between seismic samples sensed by the seismic sensors) is longer than the time it takes to transmit a seismic sample from a single sensor. In FIG. 6A, in fact, the sample interval is longer than the time it takes to transmit three seismic samples. It will be understood, however, than in other embodiments, the sample interval may be shorter than as illustrated in FIG. 6A. In instances where the sample interval is shorter than the time required to transmit the seismic samples from all of the seismic sensors on a sensor string, the seismic sensors may include a buffer or some other storage to temporarily store seismic data samples and may transmit the seismic data samples using a bucket-brigade type of system on the common data transmission channel.

Figure 7:
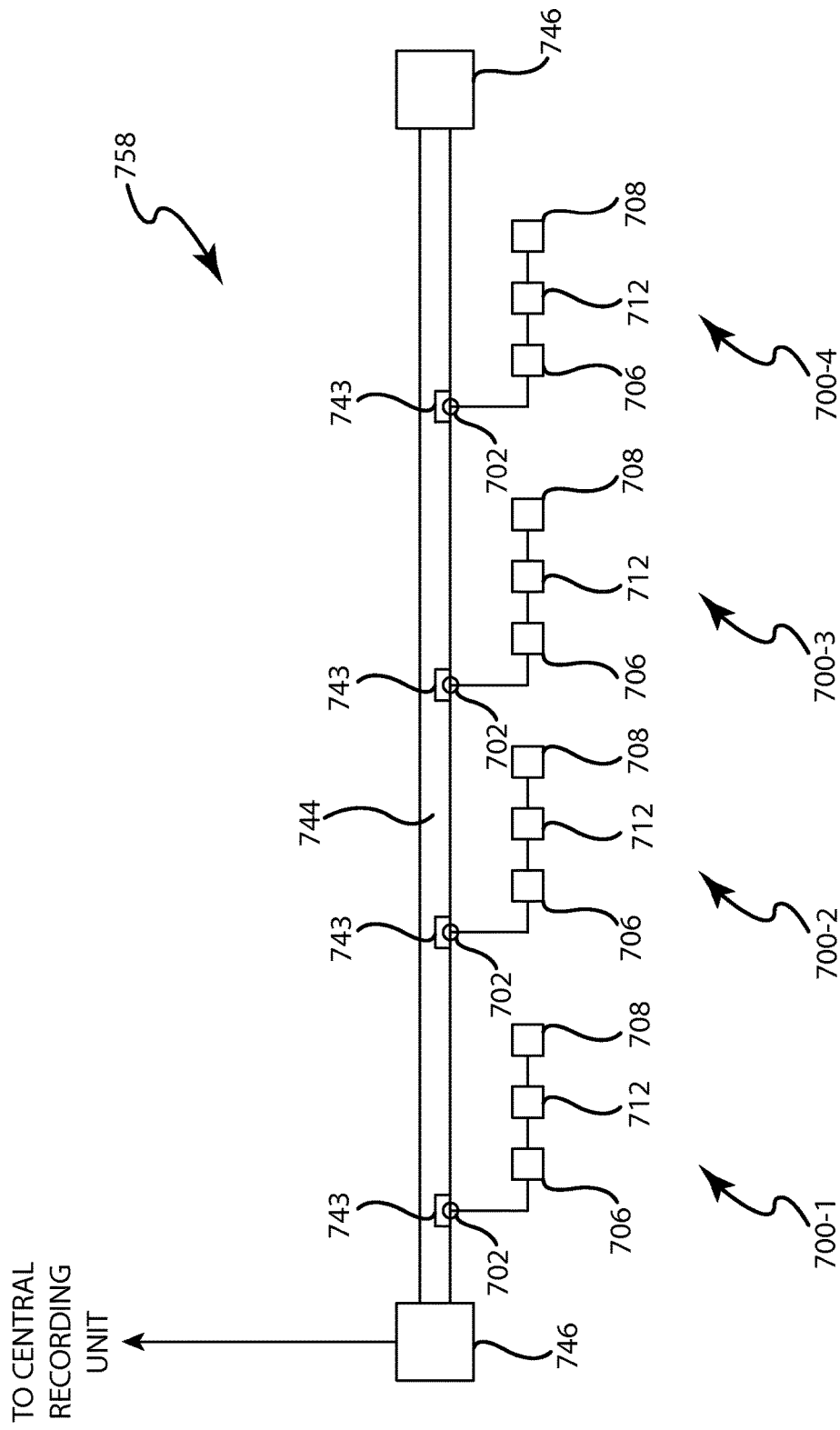
FIG. 7 is a simplified block diagram of a wired seismic data acquisition system incorporating the sensor string shown in FIG. 1B.

With reference now to FIG. 7, one example of a wired seismic data acquisition system 758 incorporating multi-station seismic sensor strings is illustrated. The seismic data acquisition system 758 illustrated in FIG. 7 includes a data acquisition unit 746 coupled to a central recording unit and a receiver line 744, with the receiver line 744 defining a plurality of takeout connections 743. The system 758 in FIG. 7 also includes a plurality of sensor strings 700-1, 700-2, 700-3, 700-4, which may be any of the sensor strings described herein. Of course, the system 758 may include many more or fewer than four sensor strings in various embodiments. Each of the sensor strings 700-1, 700-2, 700-3, 700-4 shown in the system 758 of FIG. 7 includes a respective connector 702 that is coupled to a respective takeout connection 743 of the receiver line 744, a respective common data transmission channel 704, and respective first, second, and third seismic sensors 706, 708, 712 configured to provide sensed seismic data to the respective common data transmission channel 704 of the respective sensor string 700-1, 700-2, 700-3, 700-4.

In operation, a first seismic sensor 706 of the first sensor string 700-1 of the seismic data acquisition system 758 acquires a first seismic data sample, and a second seismic sensor 708 of the first sensor string 700-1 may also acquire a second seismic data sample at substantially the same time as the first seismic sensor 706 acquires the first seismic data sample. Once the first and second seismic data samples have been acquired, they may be transmitted to the data acquisition unit 746 via the common data transmission channel 704 of the first sensor string 700-1, as illustrated in FIGS. 6A and 6B as just one example. In this time-multiplexing example, the first seismic data sample 658 may be transmitted via the common data transmission channel 704 during a first transmission period, and the second seismic data sample 660 may be transmitted via the common data transmission channel 704 during a second transmission period that does not overlap with the first transmission period. The first and second seismic data samples 658, 660 may be preceded by respective position data headers 670, 672, as described above, in some embodiments.

Figure 8:
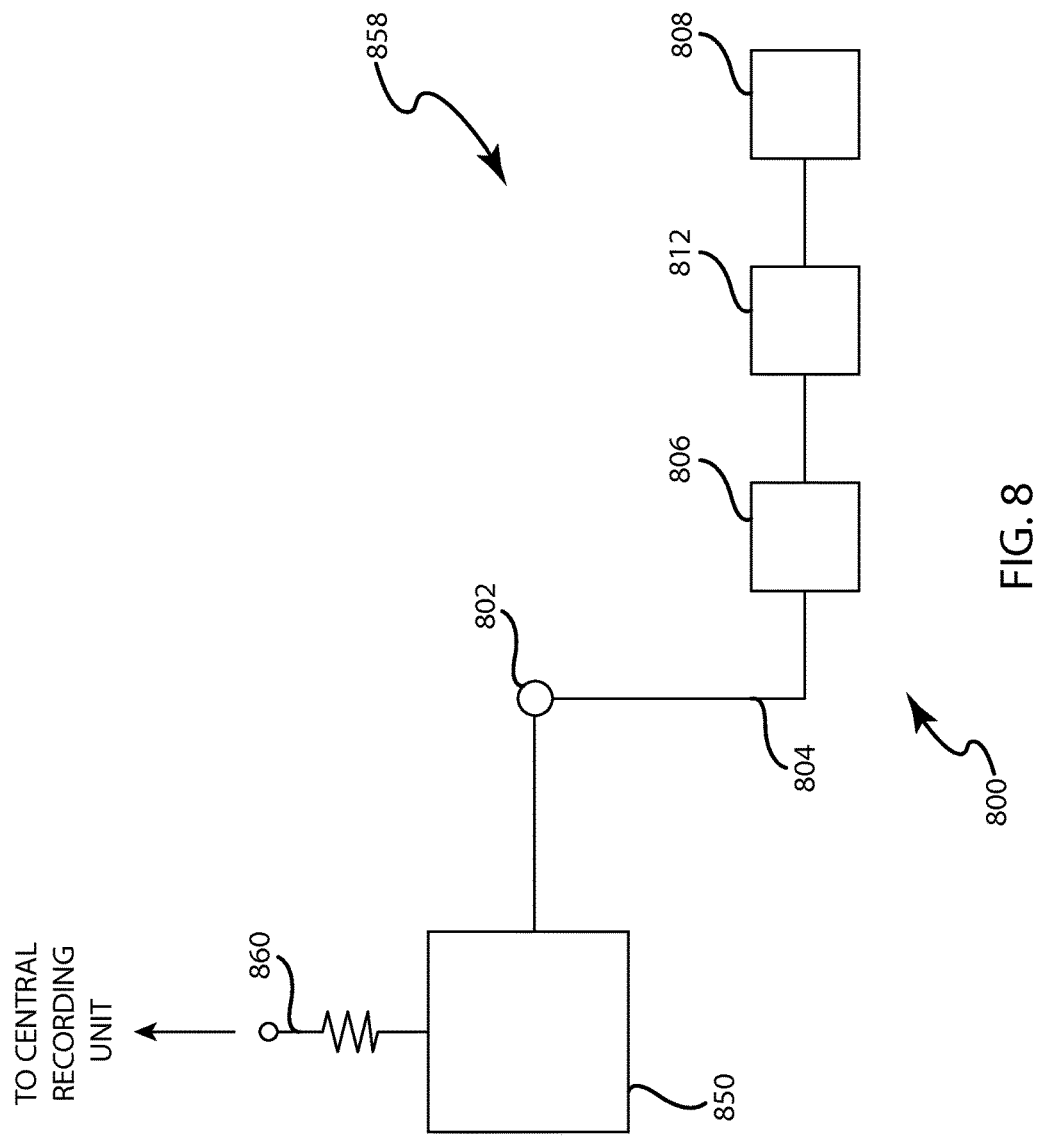
FIG. 8 is a simplified block diagram of a wireless seismic data acquisition system incorporating the sensor string shown in FIG. 1B.

With reference now to FIG. 8, one example of a wireless seismic data acquisition system 858 incorporating a multi-station sensor string is illustrated. The wireless seismic data acquisition system 858 in FIG. 8 includes a wireless data acquisition unit 850 and a sensor string 800. The sensor string 800 includes a connector 802 configured to couple the sensor string 800 to the wireless data acquisition unit 850, a common data transmission channel 804 that is coupled communicatively to the wireless data acquisition unit 850 through the connector 802, and first, second, and third seismic sensors 806, 808, 812. As described above, the first, second, and third seismic sensors 806, 808, 812 may be configured to provide sensed seismic data to the common data transmission channel 804. The wireless data acquisition unit 850 may comprise an antenna 860 to transmit seismic data wirelessly to a central recording unit 848. The operation of the wireless data acquisition system 858 illustrated in FIG. 8 is generally similar to that of the wired data acquisition system 758 illustrated in FIG. 7. Also, while a single sensor string 800 is illustrated in FIG. 8 as being coupled to the wireless data acquisition unit 850, in other examples, multiple sensor strings may be coupled to the wireless data acquisition unit 850.

Figure 9:
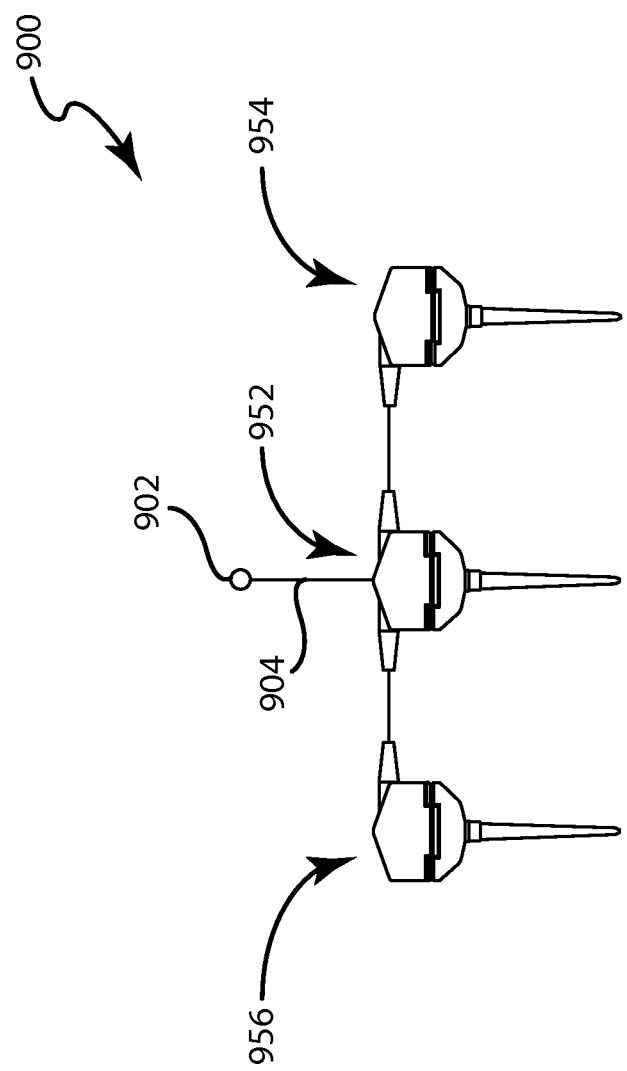
FIG. 9 is a side view of another example of a sensor string similar to that shown in FIG. 1B.

With reference to FIG. 9, an alternative embodiment of a sensor string 900 will now be described. The sensor string 900 illustrated in FIG. 9 is generally similar to the sensor string 100B illustrated in FIG. 1B—for example, the sensor string 900 illustrated in FIG. 9 includes a connector 902, a common data transmission channel 904, and a plurality of seismic sensors 956, 952, 954. Each of the plurality of seismic sensors 956, 952, 954 is configured to provide sensed seismic data to the common data transmission channel 904 of the sensor string. However, unlike FIG. 1B, the sensor string 900 illustrated in FIG. 9 defines a T-shaped structure, with the connector 902 coupled to the third seismic sensor 952 instead of the first seismic sensor 956. A portion of two or more of the housings for the seismic sensors 956, 952, 954 may be unique in color in some embodiments to assist with placement of the sensors. For example, the upper portion of the housing of the first sensor 956 may be a first color (e.g., blue), while the upper portion of the housing of the second sensor 954 may be a second, distinct color (e.g., yellow). In this manner, a person positioning the sensors may know that the first sensor housing should be positioned eastward (or some other relative direction) from the third sensor housing, and that the second sensor housing should be positioned westward (or some other relative direction) from the third sensor housing.

The systems, apparatuses, and methods in accordance with the present disclosure have been described with reference to particular embodiments thereof in order to illustrate the principles of operation. The above description is thus by way of illustration and not by way of limitation. Various modifications and alterations to the described embodiments will be apparent to those skilled in the art in view of the teachings herein. Those skilled in the art may, for example, be able to devise numerous systems, arrangements and methods which, although not explicitly shown or described herein, embody the principles described and are thus within the spirit and scope of this disclosure. Accordingly, it is intended that all such alterations, variations, and modifications of the disclosed embodiments are within the scope of this disclosure.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments.

All relative and directional references (including: upper, lower, and so forth) are given by way of example to aid the reader's understanding of the particular embodiments described herein. They should not be read to be requirements or limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

What is claimed is:

1. A seismic data acquisition system, comprising:
   a data acquisition unit configured to transmit a plurality of data samples to a central processing unit;
   a receiver line coupled to the data acquisition unit and defining a plurality of takeout connections; and
   a plurality of sensor strings, each sensor string comprising:
      a connector coupled to one takeout connection of the plurality of takeout connections;
      a common data transmission channel configured to be in communication with a data acquisition unit through the connector; and
      a plurality of seismic sensors including at least a first seismic sensor and a second seismic sensor, each of the plurality of seismic sensors configured to provide at least one separate data sample of the plurality of data samples to the common data transmission channel, each at least one separate data sample received by the central processing unit being generated by only one seismic sensor of the plurality of sensors, wherein each seismic sensor is encoded with a binary code to auto identify a position to the data acquisition unit,
   wherein all of the sensor strings connected to the common data transmission channel communicate with the data acquisition unit without any intermediate electronics for data transmission and signal processing between the respective sensor string and the data acquisition unit.

2. The apparatus of claim 1, wherein each sensor string defines a first housing enclosing the first seismic sensor and a second housing enclosing the second seismic sensor, and each of the first and second housings comprise an upper portion and a lower portion wherein the upper portions of the first and second housings are formed together with a cable defining the common data transmission channel.

3. The apparatus of claim 2, wherein the common data transmission channel is positioned in the upper portions of the first and second housings, the first seismic sensor is positioned in the lower portion of the first housing, the second seismic sensor is positioned in the lower portion of the second housing, and respective electrical couplings are provided between the respective first and second seismic sensors and the common data transmission channel.

4. The apparatus of claim 1, wherein the plurality seismic sensors provide seismic data to the common data transmission channel using multiplexing; and the multiplexing is one of time-division multiplexing, frequency-division multiplexing, or wavelength-division multiplexing.

5. The apparatus of claim 1, wherein the common data transmission channel comprises a twisted pair, and the twisted pair is also configured to provide power to the first and second seismic sensors.

6. The apparatus of claim 1, wherein the common data transmission channel is a continuous transmission medium, and each of the first and second seismic sensors are electrically coupled to the continuous transmission medium.

7. The apparatus of claim 1, wherein the first seismic sensor comprises a receiver and a transmitter, and is configured to receive sensed seismic data from the second seismic sensor via the receiver and provide its own sensed seismic data along with the sensed seismic data received from the second seismic sensor to the data acquisition unit via the transmitter.

8. The apparatus of claim 1, wherein:
the first seismic sensor comprises a first termination board and the second seismic sensor comprises a second termination board;
the first termination board is encoded with a first binary code and the second termination board is encoded with a second binary code; and
the first binary code auto identifies the first seismic sensor position on the common data transmission channel and the second binary code auto identifies the second seismic sensor position on the common data transmission channel.

9. The seismic data acquisition system of claim 1, wherein the first seismic sensor is configured to provide sensed seismic data to the common data transmission channel preceded by a first position data header, and the second seismic sensor is configured to provide sensed seismic data to the common data transmission channel preceded by a second position data header.

10. The seismic data acquisition system of claim 1, wherein the first seismic sensor is configured to provide sensed seismic data to the common data transmission channel in a first time slot, and the second seismic sensor is configured to provide sensed seismic data to the common data transmission channel in a second time slot, and the first and second time slots do not overlap.

11. The seismic data acquisition system of claim 1, wherein the first seismic sensor is configured with a first positional encoding, and the second seismic sensor is configured with a second positional encoding.

12. The system of claim 1, wherein the common data transmission channel is a single twisted pair.

13. A method for acquiring seismic data, comprising:
configuring a seismic data acquisition system to include:
a data acquisition unit configured to transmit a plurality of data samples to a central processing unit;
a receiver line coupled to the data acquisition unit and defining a plurality of takeout connections; and
a plurality of sensor strings, each sensor string comprising:
a connector coupled to one takeout connection of the plurality of takeout connections;
a common data transmission channel configured to be in communication with a data acquisition unit through the connector; and
a plurality of seismic sensors including at least a first seismic sensor and a second seismic sensor, each of the plurality of seismic sensors configured to provide at least one separate data sample of the plurality of data samples to the common data transmission channel, each at least one separate data sample received by the central processing unit being generated by only one seismic sensor of the plurality of sensors, wherein each seismic sensor is encoded with a binary code to auto identify a position to the data acquisition unit;
connecting all of the sensor strings to the common data transmission channel, wherein all of the sensor strings communicate with the data acquisition unit without any intermediate electronics for data transmission and signal processing between the respective sensor string and the data acquisition unit; and
auto identifying the position of each seismic sensor using the associated binary code.

* * * * *